Oct. 14, 1952 — C. E. GIOVANNONI — 2,613,953
MONOWHEEL VEHICLE HARNESS
Filed Dec. 6, 1949

INVENTOR
CASH E. GIOVANNONI
BY McMorrow, Berman & Davidson
ATTORNEY

Patented Oct. 14, 1952

2,613,953

UNITED STATES PATENT OFFICE 2,613,953

MONOWHEEL VEHICLE HARNESS

Cash E. Giovannoni, Boulder City, Nev.

Application December 6, 1949, Serial No. 131,275

3 Claims. (Cl. 280—58)

This invention relates to improvements in belt harness for drawing vehicles, and more particularly to an improved belt harness for use by hunters and others for pulling mono-wheel vehicles for carrying packs and game and the like, the primary object of the invention being to provide a practical and efficient device of this kind which enables supporting such vehicles in upright position while at a standstill and while in motion, and moving the same forwardly over rough terrain with greater ease and security, thereby reducing the amount of skill and strength otherwise required and eliminating a large proportion of the fatigue involved in the usual manual manipulation of such vehicles.

Other important objects and advantageous features of the invention will be apparent from the following description and the accompanying drawings, wherein, for present purposes of illustration only, a specific embodiment of the invention is set forth in detail.

Figure 1:
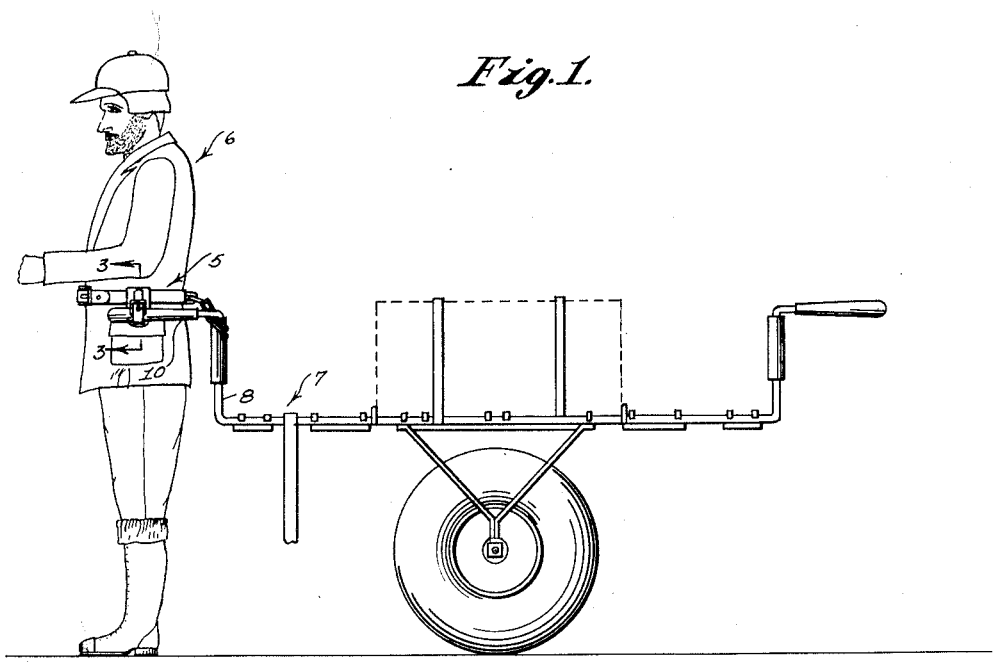
Figure 1 is a general schematic view in side elevation showing the device in use.

Referring in detail to the drawings, wherein like numerals designate like parts throughout the several views, the numeral 5 generally designates the illustrated harness shown being worn by a hunter 6, and installed on a mono-wheel vehicle 7. The illustrated vehicle 7 has a handle bar structure including laterally spaced, vertical members 8, 8 connected by a brace bar 9, with forwardly projecting handle bars 10, 10 on the upper ends of the vertical members.

The harness 5 comprises a waist belt 11 having on one end a suitable buckle 12 for securing the other end 14 about the waist of the wearer. On each side of the belt 11 is a holster 15 comprising a loop 16 slidably embracing the belt, the loop having a depending portion 17 to whose inward side is secured a hip-engaging pad 18 for conforming and non-frictional engagement with the hip of the wearer. A handle bar strap 19 is secured at one end at 20 to the upper part of the outer side of the loop portion 17, together with a buckle 21, and the free end 22 of the strap 19 is directed upwardly in forming a loop, to pass through and be secured by the buckle 21. The strap 19 is tightened sufficiently to grip the associated vehicle handle bar 10 loosely. The wearer adjusts the holsters 15 along the strap to positions in which they comfortably engage the body of the wearer.

The back of the belt 11 has anchored on the outer side thereof a metal loop or eye 23, with which is separably connected a snap hook 24 having on one end a metal ring 25, through which is slidably passed the harness strap 26.

Figure 2:
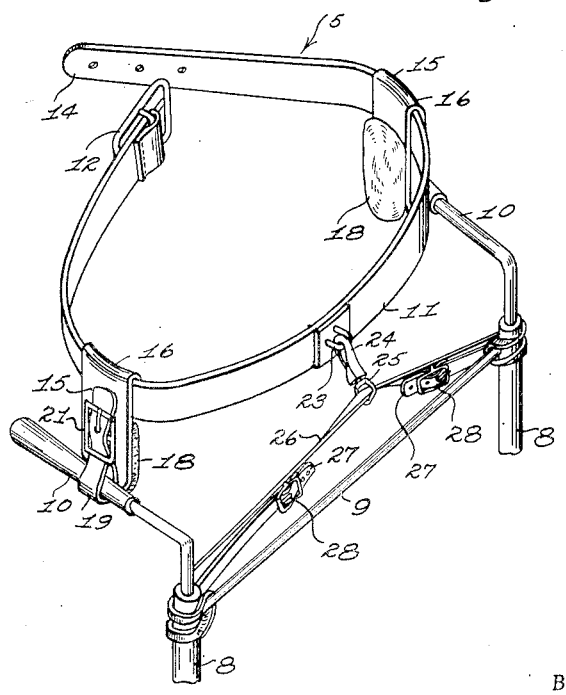
Figure 2 is an enlarged top perspective view showing the harness installed on the handle bar structure of a mono-wheel vehicle.
Figure 3:
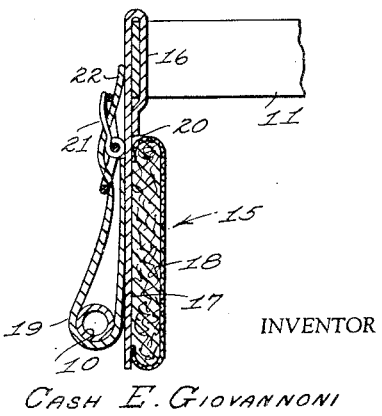
Figure 3 is an enlarged transverse vertical section taken through the harness belt and one of the holsters thereon.

The harness strap 26 is of sufficient length to extend between the vehicle uprights 8 and have the opposite ends 27 looped around the uprights and around the brace bar 9 and forwardly around the uprights 8 again and engaged through non-slip buckles 28, 28 on intermediate portions of the harness strap 26, as shown in Figure 2.

If desired, the holster straps 19 may be loosened and disengaged from the handle bars 10, 10 and the hands used on the handle bars to guide the vehicle while pulling the same by means of the connection of the belt 11 with the harness strap 26.

I claim:

1. A harness comprising a waist belt, holsters mounted on opposite sides of said belt having hip-engaging pads on their inward sides and handle bar loops on their outward sides, and a harness strap secured to the back of said waist belt for connection at opposite ends to portions of handle bars, and means connecting said harness strap to said belt comprising a single detachable fastener secured to the belt and having a ring through which said harness strap is slidably engaged.

2. The combination with a mono-wheel vehicle having a pair of laterally spaced handle bars including upright portions and forwardly directed portions and a brace bar extending between said upright portions, of a harness comprising a waist belt having holsters on opposite sides thereof having hip pads on their inward sides and loops on their outward sides through which said forwardly projecting handle bar portions extend, a harness strap extending between and having opposite end portions engaged around said upright handle bar portions and around said brace bar, and means connecting an intermediate part of said waist belt to an intermediate portion of said harness strap, buckles on said harness strap for adjustably securing the said opposite ends thereof to determine the slack in said harness strap.

3. The combination with a mono-wheel vehicle having a pair of laterally spaced handle bars including upright portions and forwardly directed portions and a brace bar extending between said upright portions, of a harness comprising a waist belt having holsters on opposite sides thereof having hip pads on their inward sides and loops on their outward sides through which said forwardly projecting handle bar portions extend, a harness strap extending between and having opposite end portions engaged around said upright handle bar portions and around said brace bar, and means connecting an intermediate part of said waist belt to an intermediate portion of said harness strap, said holsters being adjustable along said waist belt to determine the engagement of said hip pads with the body of the wearer.

CASH E. GIOVANNONI.

REFERENCES CITED

The following references are of record in the file of this patent:

UNITED STATES PATENTS

| Number | Name | Date |
|---|---|---|
| 148,744 | Parent | Mar. 17, 1874 |
| 524,909 | Roberts | Aug. 21, 1894 |
| 1,636,459 | Chappel | Sept. 21, 1925 |
| 2,239,122 | Stokes | Apr. 22, 1941 |

FOREIGN PATENTS

| Number | Country | Date |
|---|---|---|
| 255,007 | Great Britain | July 15, 1926 |